United States Patent [19]

Kidwell et al.

[11] Patent Number: 5,274,226

[45] Date of Patent: Dec. 28, 1993

[54] OPTICAL ROTARY MICROBEND POSITION SENSORS HAVING A ROTATABLE MOVABLE SHAFT

[75] Inventors: John J. Kidwell, Louisville; Stuart E. Reed, Homeworth, both of Ohio

[73] Assignee: The Babcock & Wilcox Co., New Orleans, La.

[21] Appl. No.: 977,474

[22] Filed: Nov. 17, 1992

[51] Int. Cl.$^5$ .............................................. H01J 5/16
[52] U.S. Cl. ..................... 250/227.16; 250/227.24
[58] Field of Search ................. 250/227.16, 227.14, 250/227.24, 227.28, 231.1, 231.13; 359/12, 13; 340/605, 603, 618, 815.31; 73/705, 862.23, 861.24

[56] References Cited

U.S. PATENT DOCUMENTS

| | | | |
|---|---|---|---|
| 2,586,540 | 2/1952 | Holden | 73/136 |
| 3,577,000 | 5/1971 | Warner | 250/230 |
| 3,940,609 | 2/1976 | Johnston | 250/231 SE |
| 4,083,254 | 4/1978 | Nissl | 73/517 R |
| 4,320,293 | 3/1982 | Guretzky | 250/231 SE |
| 4,436,995 | 3/1984 | Whitten | 250/227.16 |
| 4,500,870 | 2/1985 | Krohn et al. | 340/347 P |
| 4,558,601 | 12/1985 | Stasiek et al. | 73/862.23 |
| 4,679,029 | 7/1987 | Krohn et al. | 340/347 P |
| 4,698,616 | 10/1987 | Krohn et al. | 340/347 P |
| 4,749,249 | 6/1988 | Hockaday et al. | 250/227.24 |
| 4,822,135 | 4/1989 | Seaver | 350/96.29 |
| 4,931,636 | 6/1990 | Huggins | 250/226 |

Primary Examiner—David C. Nelms
Assistant Examiner—Que T. Le
Attorney, Agent, or Firm—Daniel S. Kalka; Robert J. Edwards; Vytas R. Matas

[57] ABSTRACT

A single optical fiber is used for measuring angular or rotational position in a rotary sensor. The optical fiber is used in connection with known analog intensity optoelectronics. The optical fiber is used in connection with a microbending device housed within the sensor. An input shaft of the sensor experiencing rotational motion causing the microbending device to subject the optical fiber to microbending. Microbending can be caused by a crankpin, pins located on the shaft within the housing, a transverse hole located through the shaft, or other loading arrangement. A micrometer lead screw can be used within the housing to convert the rotational motion into linear motion. The converted linear displacement is used to compress the optical fiber. Where the input shaft experiences many rotations or multiple turns the linear displacement can be applied to a spring element for carrying a load or force to a compression device. Microbending experienced by the optical fiber causes a change in the fiber radius of curvature. These microbending losses are then measured by the optoelectronics or photodetection arrangements.

9 Claims, 5 Drawing Sheets

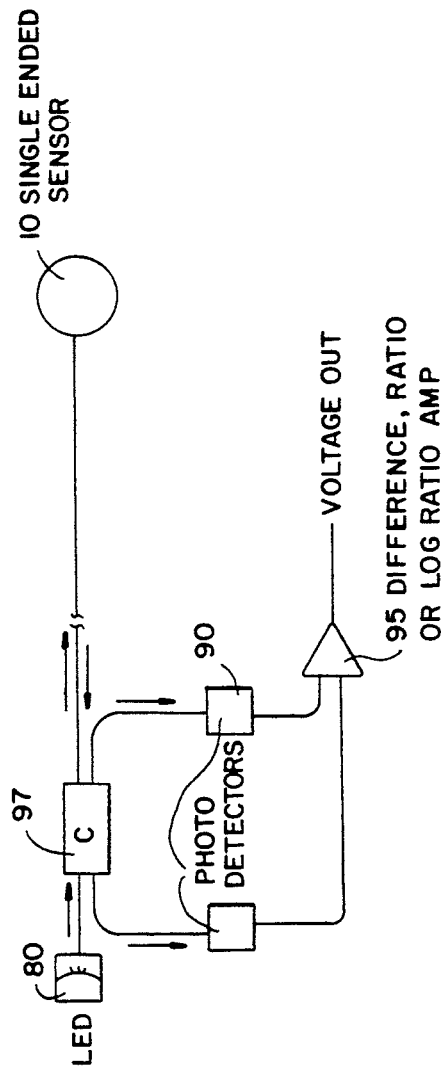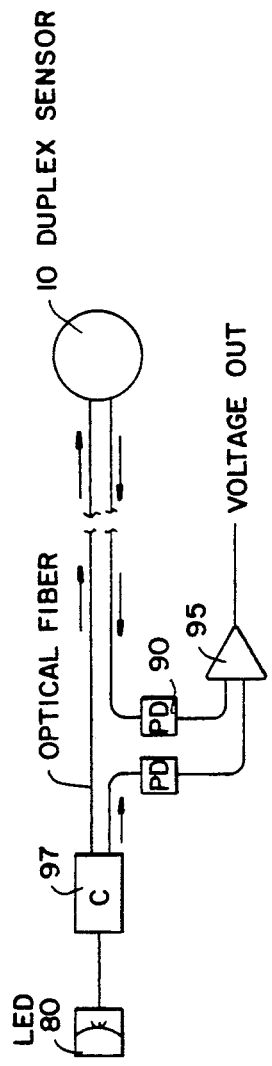

OPTICAL ROTARY MICROBEND POSITION SENSORS HAVING A ROTATABLE MOVABLE SHAFT

BACKGROUND OF THE INVENTION

1. Field of the Invention

The present invention relates in general to microbend sensors, and in particular to a new and useful optical sensor for the measurement of rotational position using a single optical channel.

2. Description of the Related Art

The measurement or sensing of rotational or angular position through the use of optical sensors is known in the field. However, these optical sensors use code plates for binary encoders that require an optical channel for each bit of resolution used in the measurement. For example, for a resolution of one part in a thousand, ten bits and ten optical channels are required. The resulting multi-channel electronics are very complex and very expensive. Additionally, these known sensors are inherently extrinsic and therefore require sealing from outside forces of the environment in order to avoid contamination and degradation. Rotational position sensors are disclosed, for example, in U.S. Pat. Nos. 4,698,616 and 4,679,029.

SUMMARY OF THE INVENTION

The present invention comprises an intrinsic fiber optical rotational position sensor which uses a single optical channel for sensing microbend losses in a multi-mode optical fiber. The present invention comprises a rotational motion sensor having a housing and an input shaft. Means for microbending, such as a crank pin, pins, a transverse hole through the shaft, loading means or similar fiber microbending means are used in conjunction with the input shaft for engagement with the optical fiber. Light is passed from a light source along the optical fiber to photodetection means such as the opto-electronics commonly known in the field. As the input shaft and microbending means are rotated relative to the fixed housing of the sensor, the optical fiber undergoes microbending due to its relationship with the microbending means in the sensor housing. This microbending causes a change in the transmission of the light through the optical fiber which is sensed at the opto-electronics. The microbending causes a change in the radius of curvature of the fiber or in the spatial extent of a fixed radius of curvature exhibiting microbending losses in the fiber. This change can thus be measured using analog intensity opto-electronics in order to determine angular or rotation positions.

The present invention also allows for the rotational motion to be measured at the input shaft of the sensor to be converted to linear motion through conversion means such as a lead screw or differential lead screw, for example, a micrometer lead screw. The rotational or angular motion of the input shaft is converted to linear motion by the lead screw and is applied to a compression means within the sensor housing. The compression means of the present invention can be a plate or tooth set of a microbend sensor wherein the optical fiber is extended between the teeth or plates of the compression means in the housing. The linear motion exhibited by the lead screw causes one plate to press against the opposite plates thereby microbending the optical fiber causing a change in the fiber radius of curvature resulting in a change in the microbending losses in the fiber. The microbending losses are then measured using the known analog intensity opto-electronics to determine the angular or rotational position experienced by rotating the input shaft.

Instead of applying the linear displacement of the micrometer lead screw directly to the microbend teeth of the compression means, the linear displacement can be applied to a spring element in the present invention for those instances where larger range, i.e., multiple turns are needed. The spring element located between the micrometer lead screw and the compression means allows for a load or force to be applied directly to the microbend teeth. In the range where the optical throughput is linear with displacement, it is also a linear function of load. Use of a linear spring element ensures that the sensor will have inherently linear characteristics with rotational position.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

In the drawings:

FIG. 7 is a schematic diagram illustrating a third measuring method used in conjunction with the present invention;

FIG. 8 is a schematic diagram illustrating a fourth measuring method used in conjunction with the present invention;

DESCRIPTION OF THE PREFERRED EMBODIMENTS

Figure 1:
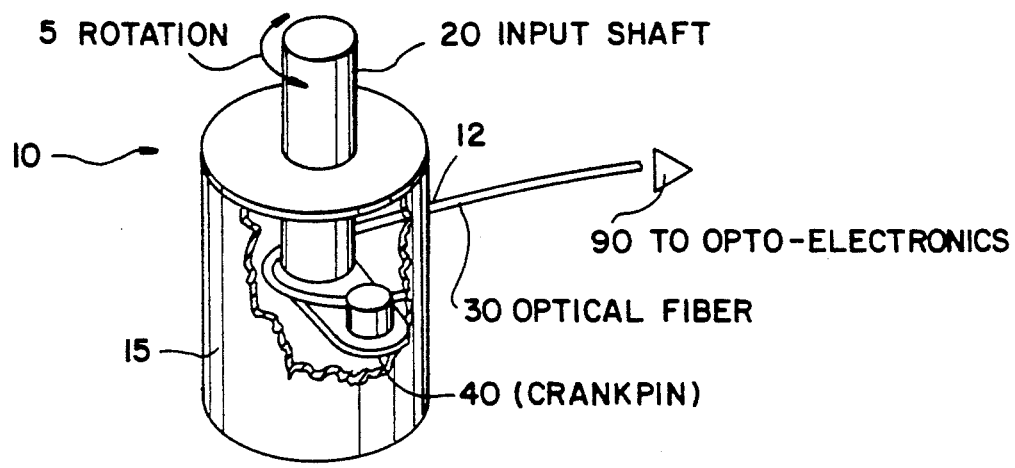
FIG. 1 is a front perspective view of the present invention.

Referring to FIG. 1, the invention embodied therein comprises a rotational sensor generally designated 10 having a housing 15 which can be cylindrical and an input shaft 20 extending into the housing 15 of the sensor 10. The input shaft 20 is rotatable in a rotation direction 5.

A crank pin 40 serves as microbending means and is used in conjunction with the input shaft 20. The input shaft 20 and crank pin 40 are used to engage an optical fiber 30 which is inserted into the housing 15 through an aperture or apertures 12 located in the housing 15. Because of the relationship between the optical fiber 30, the input shaft 20 and the crank pin 40, the optical fiber 30 is subjected to microbending as the input shaft 20 is rotated in the rotation direction 5 along with the crank pin 40. This microbending causes a change in the transmission of light through the optical fiber 30 to opto-electronics 90. Thus, the opto-electronics 90 senses and determines the microbend angular position experienced by the rotational sensor 10. In the remaining figures the same reference numerals are used to designate the same, or functionally similar part.

Figure 2:
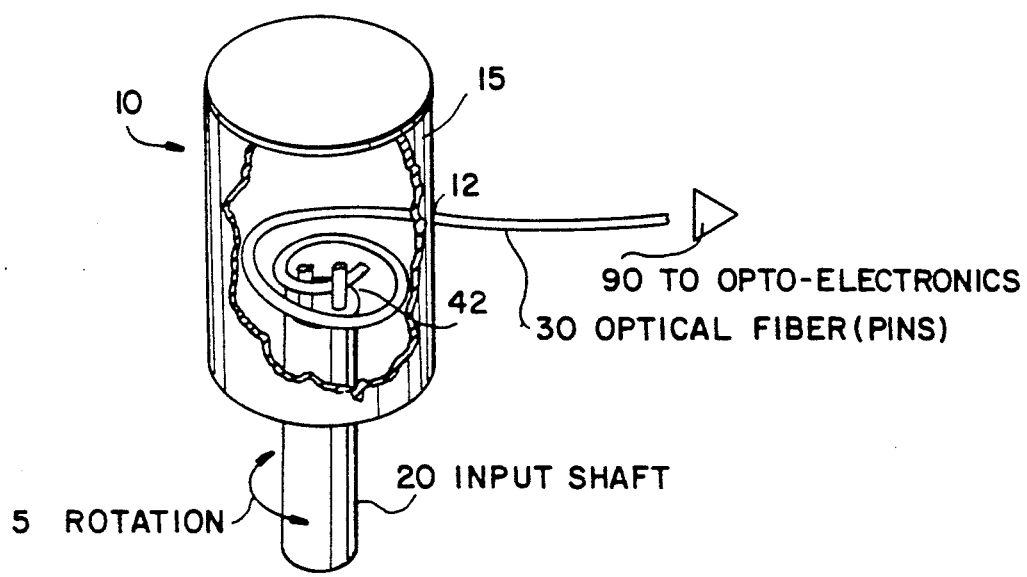
FIG. 2 is a front perspective view of a second embodiment of the present invention.

FIG. 2 illustrates that pins 42 can be used on the input shaft 20 within the housing 15 of the sensor 10. The optical fiber 30 is threaded between the pins 42 and upon rotation of the input shaft 20 in the rotation direction 5, the contact of the pins against the optical fiber 30 causes microbending in the optical fiber 30 which is in turn sensed at the opto-electronics 90.

Figure 3:
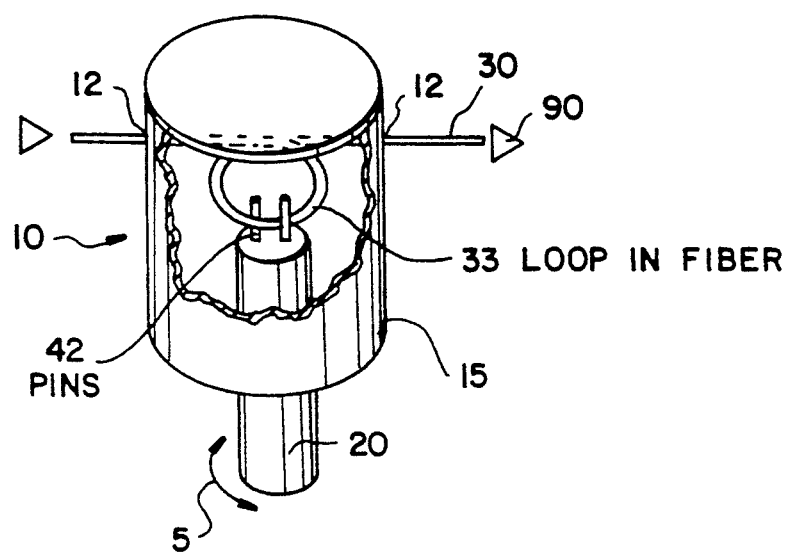
FIG. 3 is a front perspective view of a third embodiment of the present invention.

FIG. 3 shows another embodiment of the present invention in that the pins 42 are located on the input shaft 20 within the housing 15, however, the optical fiber 30 forms a loop 33 between the pins 42 within the housing 15. Such a configuration employed by the present invention allows for the optical fiber 30 to be subjected to microbending upon rotation of the input shaft 20 in the rotation direction 5.

Figure 4:
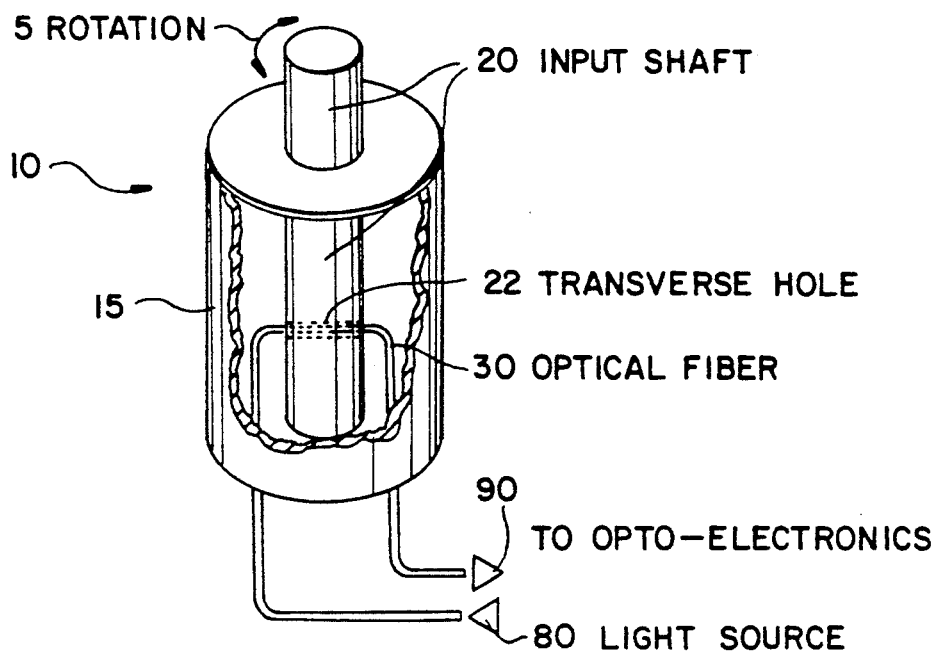
FIG. 4 is a front perspective view of a fourth embodiment of the present invention.

FIG. 4 illustrates that a transverse hole or bore 22 through the input shaft 20 can be used to achieve microbending. The optical fiber 30 is threaded through the transverse hole 22 within the housing 15 and upon rotation of the input shaft 20 in the rotation direction 5 the optical fiber 30 will experience microbending which will be sensed at the opto-electronics 90. The transverse hole 22 serves as another means for microbending that can be used by the present invention. Light is passed along the optical fiber 30 from a light source 80 to the photodetection means or opto-electronics 90.

Microbend losses experienced by the optical fiber 30 are measured through known analog intensity opto-electronics illustrated in FIGS. 5 through 8 which determine angular or rotational position.

Figure 5:
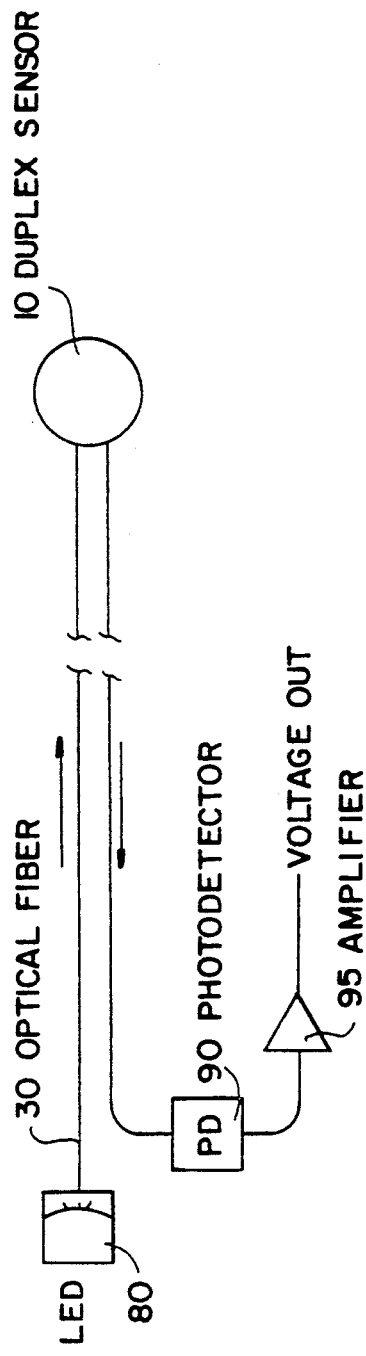
FIG. 5 is a schematic diagram illustrating a measuring method used in conjunction with the present invention.

FIG. 5 shows a basic, known analog intensity opto-electronics schematic using a light source or LED 80 and a sensor 10 along with the relationship of the optical fiber 30 with the photodetection means or photodetector 90. An amplifier 95 may also be used.

Figure 6:
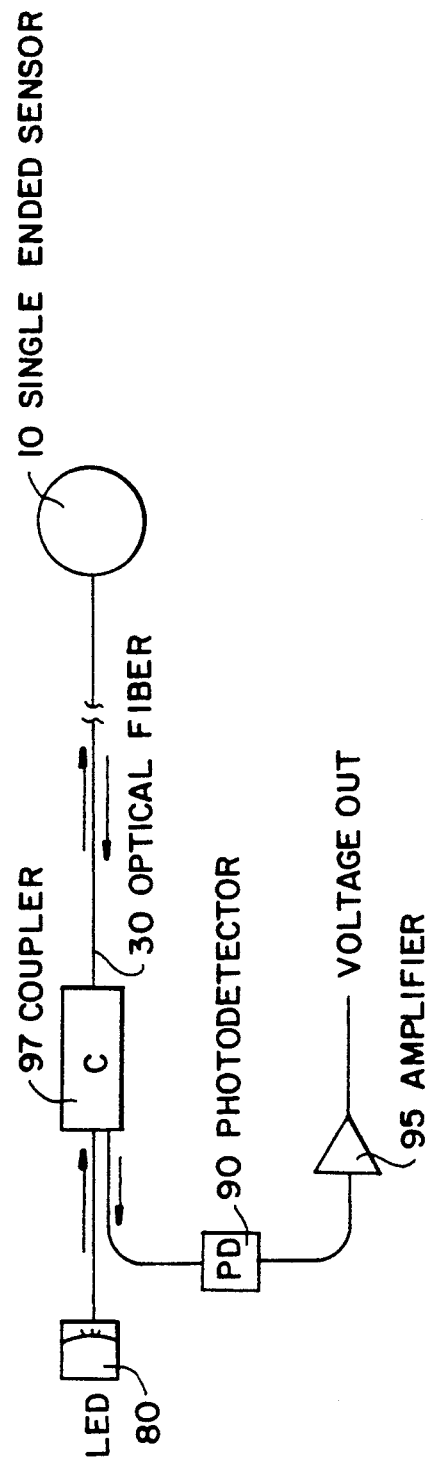
FIG. 6 is a schematic diagram illustrating a second measuring method used in conjunction with the present invention.

FIGS. 6 through 8 illustrate that a coupler 97 can be used along the optical fiber 30.

FIGS. 7 and 8 illustrate that a plurality of photodetectors 90 can be used in conjunction with the present invention.

The optical angular position sensor 10 of the present invention incorporates the advantages inherent of the known optical sensors now in use, including electromagnetic noise immunity. The present invention requires only a single optical channel and the channel wave length is not critical. Thus, broad band or narrow band sources can be used. The present invention allows for simple optical sources such as LEDs to be used as the light source and simple analog intensity detection means for measuring changes in microbending loss.

The sensitivity to rotational motion is readily controlled in the design of the loading means of the present invention, the length of the optical fiber 30 subjected to microbending and the microbend sensitivity of the optical fiber 30 which is used. The present invention allows for the sensor 10 to be built in a single-ended or duplex configuration. The sensor 10 of the present invention requires few high precision parts and is thus economical and reliable.

The sensor 10 can be constructed in a very compact form and can be readily sealed against the environment. Therefore, the present invention would only require a rotational seal on the input shaft 20 and a seal around the optical fiber 30. Microbending of the optical fiber 30 may be in the plane of rotation or perpendicular to the plane of the rotation direction 5.

Figure 9:
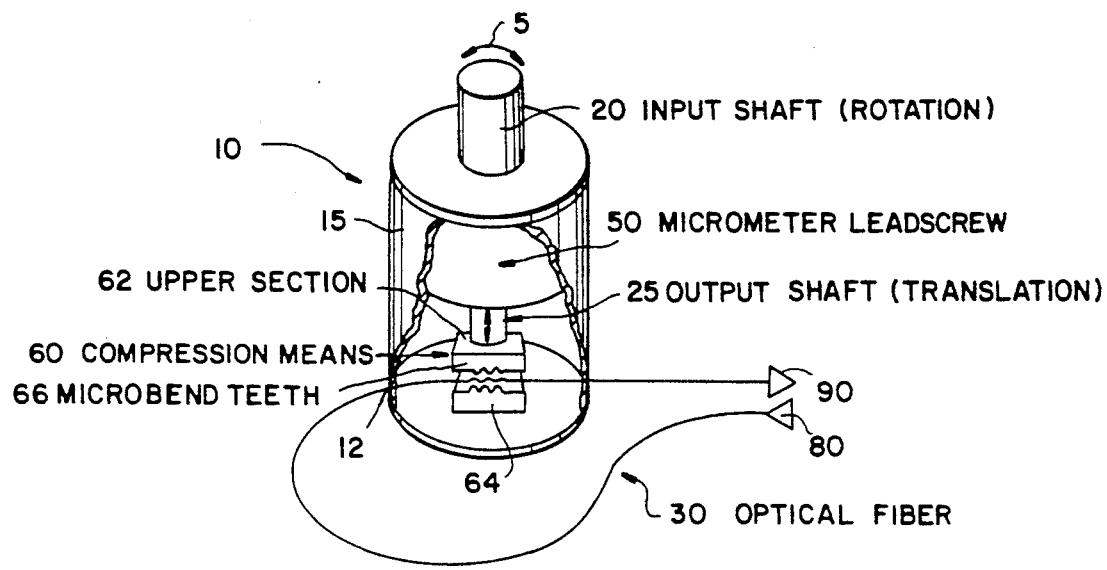
FIG. 9 is a front perspective view of a fifth embodiment of the present invention.

FIG. 9 illustrates a lead screw 50 or differential lead screws such as a micrometer lead screw used in conjunction with the input shaft 20 within the housing 15. An output shaft 25 is used in conjunction with the micrometer lead screw 50 and is retractable into and out of the micrometer lead screw 50. The micrometer lead screw 50 converts the rotational or angular motion experienced by the input shaft 20 into linear motion and positions the output shaft 25 accordingly. The output shaft 25 is connected directly to compression means 60. Compression means 60 has an upper section 62 which is attached to the output shaft 25. A lower section 64 of the compression means 60 is attached to the housing 15 of the sensor 10. The optical fiber 30 is extended between the upper section 62 and the lower section 64 of the compression means 60. Microbend teeth 66 are provided at an inner surface of both the upper section 62 and the lower section 64 for subjecting the optical fiber 30 to microbending.

Upon rotation of the input shaft 20 in the rotation direction 5, the micrometer lead screw converts the rotational or angular motion into linear motion by moving the output shaft 25 and consequently the upper section 62 of the compression means 60 approaches the lower section 64 thereby compressing the optical fiber 30 causing microbending and a change in the light transmitted along the optical fiber 30. The microbending loss is sensed at the opto-electronics 90. the microbending caused by the compression means 60 causes a change in the fiber radius of curvature thereby resulting in microbend losses. The output of the sensor 10 is linearized using log-ratio electronics at the opto-electronics 90.

Figure 10:
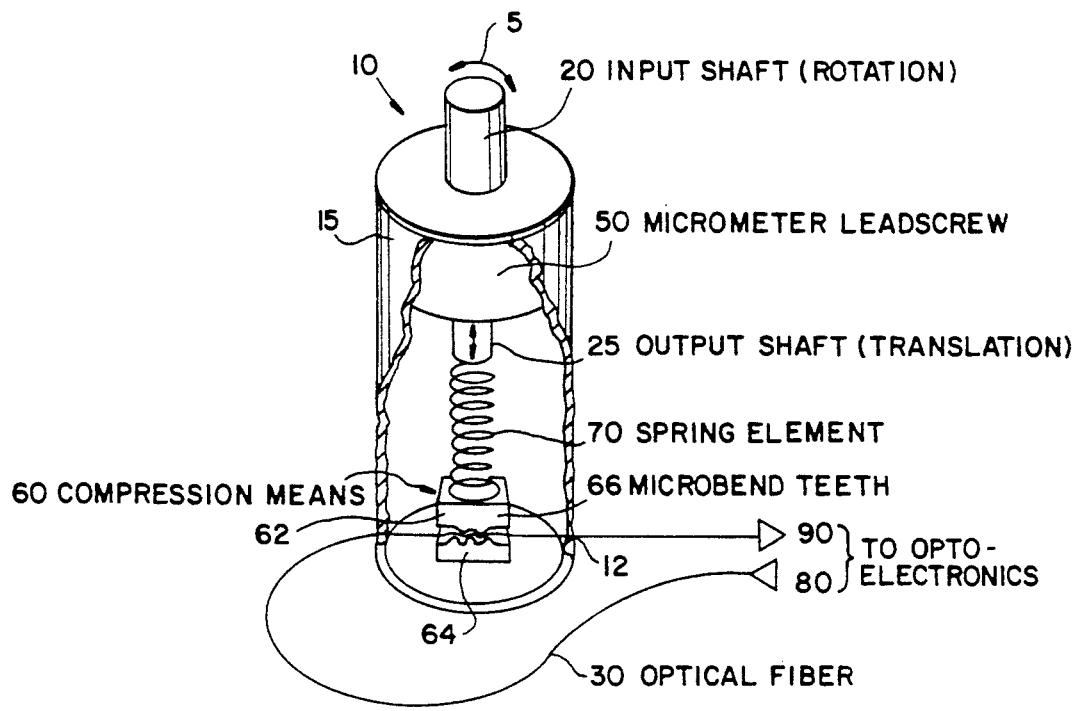
FIG. 10 is a front perspective view of a sixth embodiment of the present invention.

FIG. 10 shows that a spring element 70 or spring means can be used between the output shaft 25 and the upper section 62 of the compression means 60. The spring element 70 is used where multiple turns are experienced at the input shaft 20. After the rotational motion has been converted to linear motion by the micrometer lead screw 50, the linear displacement is applied to the spring element 70 through the output shaft 25 which is operatively connected to the micrometer lead screw 50. The displacement applied to the spring element 70 allows for a load to be applied by the spring element 70 on the compression means 60. The upper section 62 of the compression means 60 is joined with the spring element 70 and therefore the load exhibited by the spring element 70 is brought to bear on the optical fiber 30 which is extended between the upper section 62 and the lower section 64. Through the use of the spring element 70 angular or rotational measurement by the opto-electronics 90 is based on displacement or force measurement.

The micrometer lead screw 50 used by the present invention has extremely efficient linearity as a function of rotation of the input shaft 20. The sensor 10 has a relatively large range in which the [throughput] in [dB] is a linear function of the relative motion of the compression means 60. Thus, this allows the sensor 10 to achieve a high degree of linearity with angular position in a straight forward manner.

While a specific embodiment of the invention has been shown and described in detail to illustrate the application of the principles of the invention, it will be understood that the invention may be embodied otherwise without departing from such principles. For example, in the embodiment shown, the input shaft is the moveable component and the sensor housing is the fixed component, producing the sensed relative motion between the components. It can be seen that this same relative motion between the components can be beneficially produced by making the housing the moveable component and the shaft the fixed component, with the same results.

What is claimed is:

1. An optical sensor for measuring rotational position, the sensor comprising:
   a housing having an aperture therein;
   an optical sensor fiber for receiving light from a light source and passing the light to photodetection means, the fiber extending into the housing through the aperture, the light in the fiber having a transmission characteristic, the transmission characteristic changing if the sensor fiber is subjected to microbending;
   photodetection means for measuring changes in the light when the sensor fiber is subjected to microbending;
   a section of the sensor fiber between the light source and the photodetection means positioned in the housing and extending through the aperture; and
   a shaft within the housing, the shaft being rotationally movable with respect to the housing, a crankpin connected to the shaft within the housing, the crankpin being rotationally movable with the shaft and engaged with the section of the sensor fiber for causing the microbending.

2. The optical sensor according to claim 1, wherein the housing has a plurality of apertures therethrough such that the section of the sensor fiber extends into the housing through a first aperture and leads out of the housing through a second aperture.

3. An optical sensor for measuring rotational position, the sensor comprising:
   a housing having an aperture therein;
   an optical sensor fiber for receiving light from a light source and passing the light to photodetection means, the fiber extending into the housing through the aperture, the light in the fiber having a transmission characteristic, the transmission characteristic changing if the sensor fiber is subjected to microbending;
   photodetection means for measuring changes in the light when the sensor fiber is subjected to microbending;
   a section of the sensor fiber between the light source and the photodetection means positioned in the housing and extending through the aperture; and
   a shaft within the housing, the shaft being rotationally movable with respect to the housing, the shaft having a plurality of pins protruding at one end within the housing, the pins being for engaging the section of the sensor fiber for causing the microbending.

4. The optical sensor according to claim 3, wherein the section of the sensor fiber is a loop which engages the pins.

5. An optical sensor for measuring rotational position, the sensor comprising:
   a housing having an aperture therein;
   an optical sensor fiber for receiving light from a light source and passing the light to photodetection means, the fiber extending into the housing through the aperture, the light in the fiber having a transmission characteristic, the transmission characteristic changing if the sensor fiber is subjected to microbending;
   photodetection means for measuring changes in the light when the sensor fiber is subjected to microbending;
   a section of the sensor fiber between the light source and the photodetection means positioned in the housing and extending through the aperture; and
   a shaft within the housing, the shaft being rotationally movable with the housing, the shaft having a hole therethrough with the section of the sensor fiber engaged through the hole for subjecting the section of the sensor fiber to microbending as the shaft rotates within the housing.

6. An optical sensor for measuring rotational position, the sensor comprising:
   a housing having an aperture therein;
   an optical sensor fiber for receiving light from a light source and passing the light to photodetection means, the fiber extending into the housing through the aperture, the light in the fiber having a transmission characteristic, the transmission characteristic changing if the sensor fiber is subjected to microbending;
   photodetection means for measuring changes in the light when the sensor fiber is subjected to microbending;
   a section of the sensor fiber between the light source and the photodetection means positioned in the housing and extending through the aperture; and
   a shaft within the housing, the shaft being rotationally movable with the housing, means for conversion of rotary motion to linear motion operatively connected to the shaft and being within the housing such that rotation by the shaft and the housing is converted into a linear motion, the means for conversion of rotary motion to linear motion being operatively connected to compression means for compression of the section of the sensor fiber within the housing such that linear motion of the means for conversion of rotary motion to linear motion causes the means for compression to subject the section of the sensor fiber to microbending.

7. The optical sensor according to claim 6, wherein the means for compression comprises an upper section and a lower section, the lower section being fixed within the housing and the upper section being joined to a movable shaft, the movable shaft retractably connected to the means for conversion of rotary motion to linear motion movable according to the linear motion of the means for conversion of rotary motion to linear motion, the section of the sensor fiber being positioned between the upper section and the lower section, the upper section being linearly movable with the movable shaft to the lower section for compressing and microbending the section of the sensor fiber between the upper section and the lower section.

8. The optical sensor according to claim 7, including plurality of teeth on inner surfaces of both the upper section and the lower section for microbending the section of the sensor fiber between the upper section and the lower section.

9. The optical sensor according to claim 7 including spring means attached between the movable shaft and the upper section for converting the linear motion into a force for compression of the section of the sensor fiber between the upper section and the lower section.

* * * * *